US007155600B2

(12) United States Patent
Burky et al.

(10) Patent No.: US 7,155,600 B2
(45) Date of Patent: Dec. 26, 2006

(54) METHOD AND LOGICAL APPARATUS FOR SWITCHING BETWEEN SINGLE-THREADED AND MULTI-THREADED EXECUTION STATES IN A SIMULTANEOUS MULTI-THREADED (SMT) PROCESSOR

(75) Inventors: William Elton Burky, Austin, TX (US); Michael Stephen Floyd, Austin, TX (US); Ronald Nick Kalla, Round Rock, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/422,648

(22) Filed: Apr. 24, 2003

(65) Prior Publication Data

US 2004/0215932 A1    Oct. 28, 2004

(51) Int. Cl.
  G06F 15/00   (2006.01)
  G06F 15/76   (2006.01)
  G06F 7/38    (2006.01)
  G06F 9/00    (2006.01)
  G06F 9/44    (2006.01)
(52) U.S. Cl. .......................... 712/229; 712/32; 712/43; 712/228
(58) Field of Classification Search ............... 712/228, 712/244, 229, 32, 43
  See application file for complete search history.

(56) References Cited

U.S. PATENT DOCUMENTS 5,822,602 A * 10/1998 Thusoo ........................ 712/1
6,549,930 B1    4/2003 Chrysos et al.
6,847,578 B1    1/2005 Ranganathan
2001/0054057 A1 * 12/2001 Long et al. ................... 709/108
2002/0163520 A1 * 11/2002 Hardin et al. ................ 345/475
2002/0194251 A1   12/2002 Richter et al.
2003/0033509 A1 *  2/2003 Leibholz et al. ............. 712/228
2004/0054876 A1 *  3/2004 Grisenthwaite et al. ..... 712/218
2006/0037025 A1    2/2006 Janssen et al.

OTHER PUBLICATIONS

Czajkowski, et al., "Resource Management for Extensible Internet Servers", ACM SIGOPS European Workshop, p. 33-39, 1998.
Bridges, et al., "A CPU Utilization Limit for Massively Parallel MIMD Computers", Frontiers of Massively Parallel Computing, Oct. 19-21, 1992, pp. 83-92.

* cited by examiner

Primary Examiner—Fritz Fleming
Assistant Examiner—Jesse Moll
(74) Attorney, Agent, or Firm—Mitch Harris, Atty at Law, LLC; Andrew M. Harris; Casimer K. Salys

(57) ABSTRACT

A method and logical apparatus for switching between single-threaded and multi-threaded execution states within a simultaneous multi-threaded (SMT) processor provides a mechanism for switching between single-threaded and multi-threaded execution. The processor receives an instruction specifying a transition from a single-threaded to a multi-threaded mode or vice-versa and halts execution of all threads executing on the processor. Internal control logic controls a sequence of events that ends instruction prefetching, dispatch of new instructions, interrupt processing and maintenance operations and waits for operation of the processor to complete for instructions that are in process. Then, the logic determines one or more threads to start in conformity with a thread enable state specifying the enable state of multiple threads and reallocates various resources, dividing them between threads if multiple threads are specified for further execution (multi-threaded mode) or allocating substantially all of the resources to a single thread if further execution is specified as single-threaded mode. The processor then starts execution of the remaining enabled threads.

16 Claims, 3 Drawing Sheets

METHOD AND LOGICAL APPARATUS FOR SWITCHING BETWEEN SINGLE-THREADED AND MULTI-THREADED EXECUTION STATES IN A SIMULTANEOUS MULTI-THREADED (SMT) PROCESSOR

CROSS-REFERENCE TO RELATED APPLICATIONS

The present application is related to co-pending U.S. patent application Ser. No. 10/422,649 entitled "METHOD AND LOGICAL APPARATUS FOR MANAGING RESOURCE REDISTRIBUTION IN A SIMULTANEOUS MULTI-THREADED (SMT) PROCESSOR", U.S. patent application Ser. No. 10/422,651 entitled "METHOD AND LOGICAL APPARATUS FOR RENAME REGISTER REALLOCATION IN A SIMULTANEOUS MULTI-THREADED (SMT) PROCESSOR", and U.S. patent application Ser. No. 10/422,682 entitled "DYNAMIC SWITCHING OF MULTITHREADED PROCESSOR BETWEEN SINGLE THREADED AND SIMULTANEOUS MULTI-THREADED MODES", filed concurrently with this application. The specifications of the above-referenced patent applications are incorporated herein by reference.

BACKGROUND OF THE INVENTION

1. Technical Field

The present invention relates generally to processors and computing systems, and more particularly, to a simultaneous multi-threaded (SMT) processor.

2. Description of the Related Art

Present-day high-speed processors include the capability of simultaneous execution of instructions, speculative execution and loading of instructions and simultaneous operation of various resources within a processor. In particular, it has been found desirable to manage execution of one or more threads within a processor, so that more than one execution thread may use the processor resources more effectively than they are typically used by a single thread.

Prior processor designs have dealt with the problem of managing multiple threads via a hardware state switch from execution of one thread to execution of another thread. Such processors are known as hardware multi-threaded (HMT) processors, and as such, can provide a hardware switch between execution of one or the other thread. An HMT processor overcomes the limitations of waiting on an idle thread by permitting the hardware to switch execution to a non-idle thread. Execution of both threads can be performed not simultaneously, but by allocating execution slices to each thread when neither are idle. However, the execution management and resource switching (e.g., register swap out) in an HMT processor introduce overhead that makes the processor less efficient than running on two single-threaded processors. In addition HMT does not allow threads to take full advantage of instruction parallelism by using multiple execution engines that are usually not all busy at the same time, since only one thread is executing at a given time.

Simultaneous multi-threaded (SMT) processors provide an even more efficient use of processor resources, as multiple threads may simultaneously use processor resources. Multiple threads are concurrently executed in an SMT processor so that multiple processor execution units, such as floating point units, fixed point instruction units, load/store units and others can be performing tasks for one (or more depending on the execution units' capabilities) of multiple threads simultaneously. Storage and register resources may also be allocated on a per-thread basis so that the complete internal state switch of the HMT is avoided.

However, at times when threads are stalled, a single-threaded processor would otherwise operate more efficiently by comparison and there are conditions under which the predictability of single-threaded execution is preferred, such as when processing must complete for a single task within an allotted time span.

It is therefore desirable to provide an SMT processor that can provide the advantages of a single-threaded processor and a multi-threaded processor. It is further desirable to provide a method and logical apparatus for managing thread execution within such a processor.

SUMMARY OF THE INVENTION

The objectives of providing a processor combining the advantages of a single-threaded processor and a multi-threaded processor along with management of thread execution are provided in a simultaneous multi-threaded (SMT) processor incorporating thread management logic and a method of thread management that manage transitions between single-threaded operation and multi-threaded operation. The processor includes a control unit that receives an instruction indicating a thread mode switch and halts execution of all threads running on the processor. A thread enable register indicating an enable state for multiple threads is written by the thread mode switch instruction to determine what threads are selected for further execution and the processor then starts one or more threads in conformity with the thread enable state.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
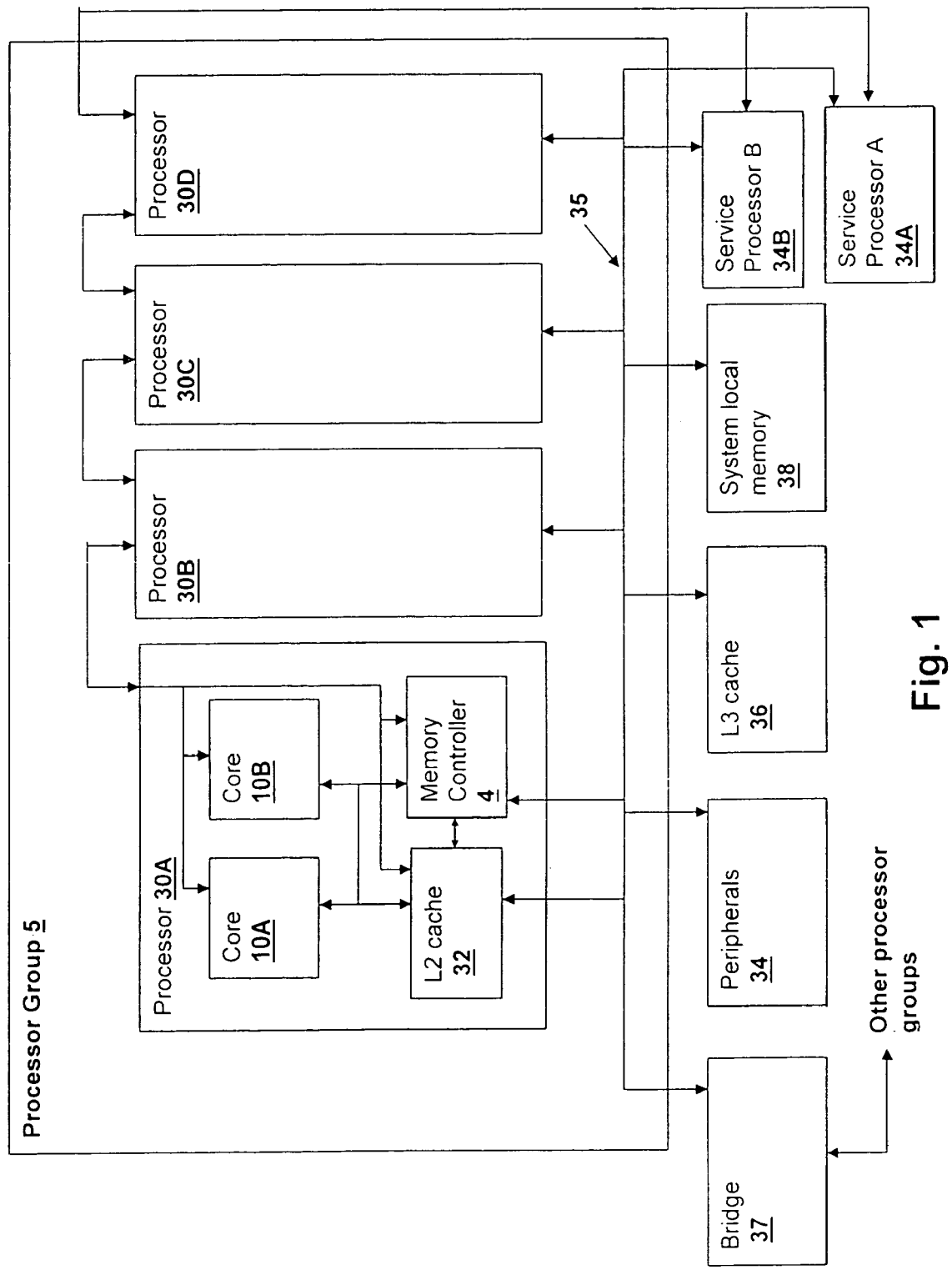
FIG. 1 is a block diagram of a system in accordance with an embodiment of the invention.

With reference now to the figures, and in particular with reference to FIG. 1, there is depicted a block diagram of a system in accordance with an embodiment of the present invention. The system includes a processor group 5 that may be connected to other processor groups via a bridge 37 forming a super-scalar processor. Processor group 5 is connected to an L3 cache unit 36 system local memory 38 and various peripherals 34, as well as to two service processors 34A and 34B. Service processors provide fault supervision, startup assistance and test capability to processor group 5 and may have their own interconnect paths to other processor groups as well as connecting all of processors 30A–D.

Within processor group 5 are a plurality of processors 30A–D, generally fabricated in a single unit and including a plurality of processor cores 10A and 10B coupled to an L2 cache 32 and a memory controller 4. Cores 10A and 10B provide instruction execution and operation on data values for general-purpose processing functions. Bridge 37, as well as other bridges within the system provide communication over wide buses with other processor groups and bus 35 provide connection of processors 30A–D, bridge 37, peripherals 34, L3 cache 36 and system local memory 38. Other global system memory may be coupled external to bridge 37 for symmetrical access by all processor groups.

Processor cores 10A and 10B are simultaneous multi-threaded (SMT) processors capable of concurrent execution of multiple threads. Processor cores 10A and 10B further support a single-threaded operating mode for efficient execution of a single thread when program execution conditions dictate single threaded operation, e.g., when high-priority program execution must be completed by a known time, or when one thread in a multi-threaded processor is known to be idle. Multi-threading introduces some inefficiencies over full-time execution of a single-thread, but overall there is a system efficiency advantage as threads are often idle waiting on other tasks to complete. Therefore transitioning between single-threaded and multi-threaded mode provides an advantage in adapting to one or more of the above-described conditions, and embodiments of the present invention provide accounting for processor time in a manner consistent with a processor that provides processor time accounting responsive to such transitions.

Figure 2:
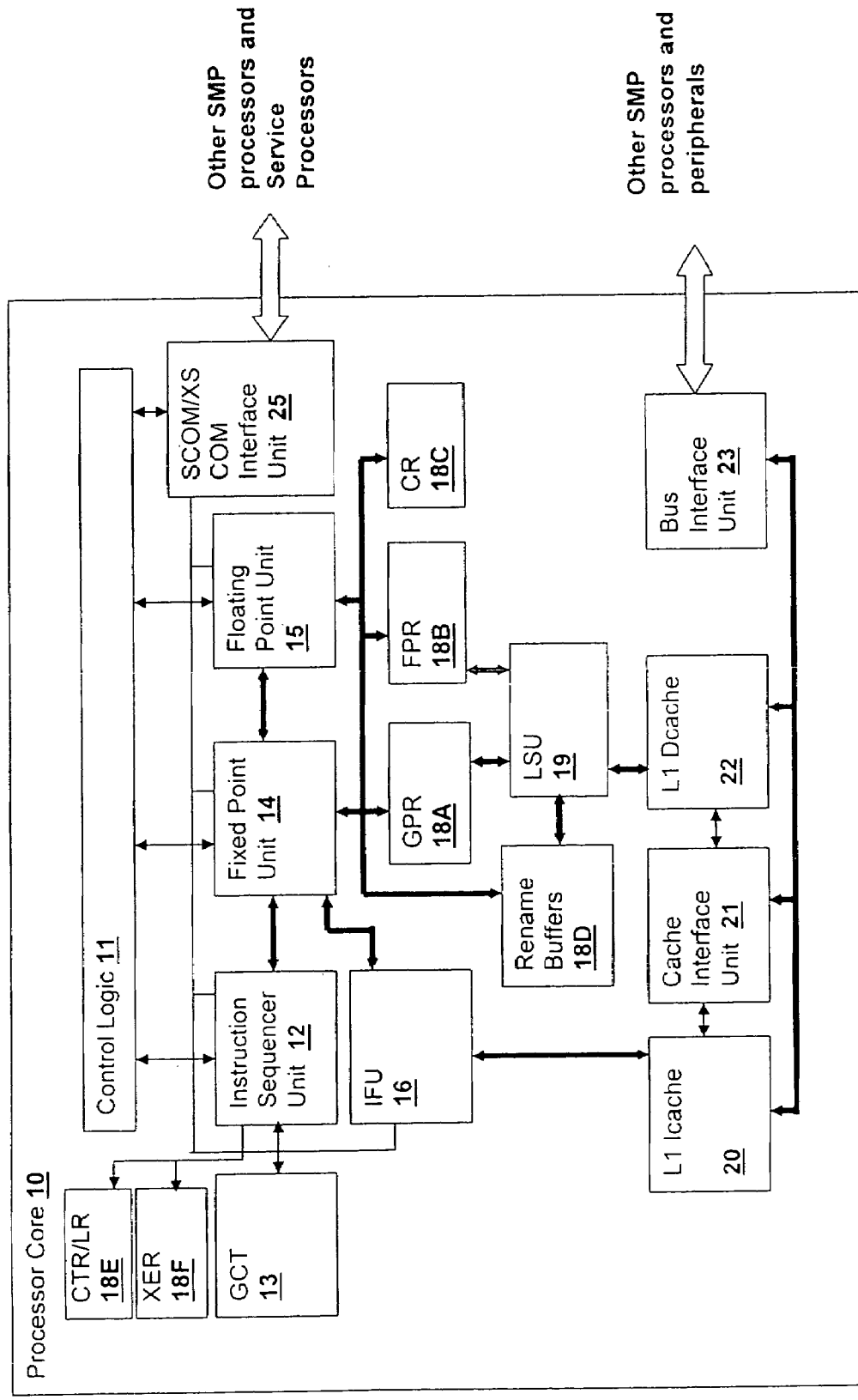
FIG. 2 is a block diagram of a processor core in accordance with an embodiment of the invention.

Referring now to FIG. 2, details of a processor core 10 having features identical to processor cores 10A and 10B is depicted. A bus interface unit connects processor core 10 to other SMT processors and peripherals and connects L1 Dcache 22 for storing data values, L1 Icache 20 for storing program instructions and cache interface unit 21 to external memory, processor and other devices. L1 Icache 20 provides loading of instruction streams in conjunction with instruction fetch unit IFU 16, which prefetches instructions and may include speculative loading and branch prediction capabilities. An instruction sequencer unit (ISU) 12 controls sequencing of instructions issued to various internal units such as a fixed point unit (FXU) 14 for executing general operations and a floating point unit (FPU) 15 for executing floating point operations. Global completion tables (GCT) 13 track the instructions issued by ISU 12 via tags until the particular execution unit targeted by the instruction indicates the instructions have completed execution. An SCOM/XSCOM interface unit 25 provides a connection to external service processors 34A–B.

Fixed point unit 14 and floating point unit 15 are coupled to various resources such as general-purpose registers (GPR) 18A, floating point registers (FPR) 18B, condition registers (CR) 18C, rename buffers 18D, count registers/link registers (CTR/LR) 18E and exception registers (XER) 18F. GPR 18A and FPR 18B provide data value storage for data values loaded and stored from L1 Dcache 22 by load store unit (LSU) 19. CR 18C stores conditional branching information and rename buffers 18D (which may comprise several rename units associated with the various internal execution units) provides operand and result storage for the execution units. XER 18F stores branch and fixed point exception information and CTR/LR 18E stores branch link information and count information for program branch execution.

GPR 18A, FPR 18B, CR 18C, rename buffers 18D, CTR/LR 18E and XER 18F are resources that include some fixed (architected) registers that store information during execution of a program and must be provided as a fixed set for each executing thread, other non-architected registers within the above resources are free for rename use. Control logic 11 is coupled to various execution units and resources within processor core 10, and is used to provide pervasive control of execution units and resources in accordance with the method of the present invention. The above-incorporated patent application "METHOD AND LOGICAL APPARATUS FOR RENAME REGISTER REALLOCATION IN A SIMULTANEOUS MULTI-THREADED (SMT) PROCESSOR" includes details of a rename register remapping methodology that can be used to implement the remapping required for reallocation of rename resources when switching between ST and SMT mode.

Prior processing systems manage resources on a thread switch from executing a first thread to a second thread in one of two manners: the first to provide a complete duplicate set of resources as in the HMT processors described above; the second is to completely save and restore the state of the thread for which execution is stopped as the processor switches between executing one of the threads in favor of the other (traditional single-threaded processing). The processor of the present invention provides an alternative: multiple threads may be active on the processor at one time and resources are retained for both threads in multi-threaded mode. In single-threaded mode, all potentially shared resources are dedicated to the single executing thread. Some resources are replicated by necessity, and therefore cannot be reallocated (e.g., the machine state register). Resources are reallocated each time a transition is made between ST and SMT mode, providing for optimum use of resources depending on the mode.

On a transition (switch) from SMT to ST mode, a thread (referred to as a dying thread) that is being removed from execution on the processor is completely removed. The software directing the thread change receives indications when threads complete processing and therefore knows when a particular thread's execution is complete. The software either dispatches a new process to the thread (keeping it alive) or if there is no work to be scheduled, the software kills the thread, permitting release of all resources to the single thread that remains executing (referred to as the surviving thread). On a switch from ST to SMT mode, a thread that is restarted or revived (referred to as the reviving thread) has its context generated by the software. In the illustrative embodiment, this is accomplished by always starting the thread in a fixed location that is handled by the lowest level of software: the system reset interrupt (SRI) handler. The SRI is the same interrupt mechanism used at machine boot time to allow software to initialize the hardware and commence process execution. After a switch to SMT mode, the reviving thread is sent the SRI immediately after it is enabled for execution, and other than the delivery of the SRI, the method for transitioning from SMT to ST mode and transitioning from ST to SMT mode is handled in a substantially identical manner, providing a mode switch algorithm that presents uniform behavior to the software managing the mode switch.

Figure 3:
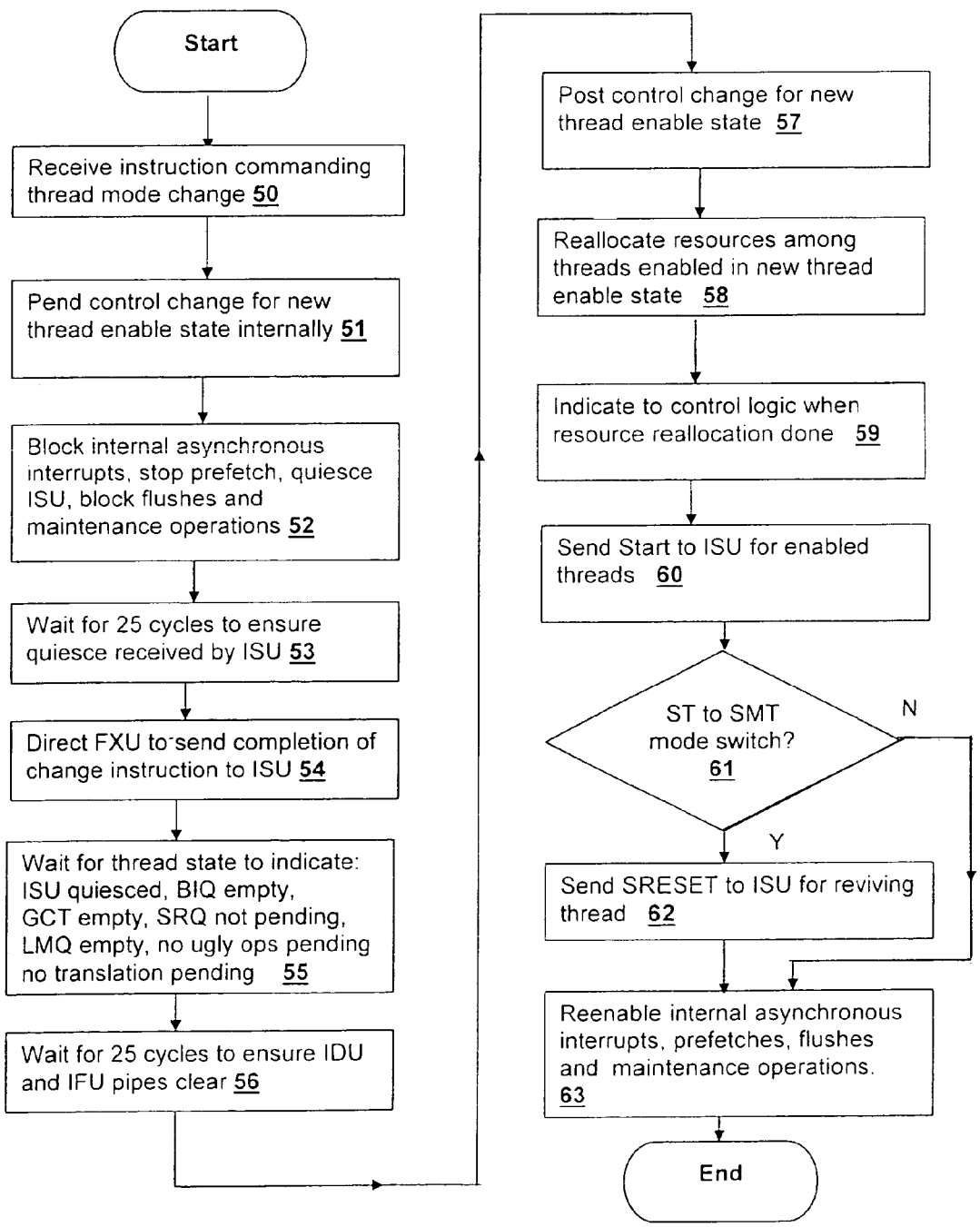
FIG. 3 is a flowchart depicting a method in accordance with an embodiment of the present invention.

Referring now to FIG. 3 and also with reference to FIG. 2, a method for managing thread transitions in accordance with an embodiment of the invention that controls thread mode transitions within processor core 10 is depicted in a flow chart. A mode switch is initiated by issue of a thread mode change instruction (step 50) received by control logic 11 from FXU 14. In the illustrative embodiment, a "move to control register—mtctrl" instruction sets a thread enable control register within control logic 11 (but locatable in other blocks within processor core 10) that triggers an action by control logic 11 to change the thread execution state in conformity with the requested further execution state of multiple threads. But, in alternative embodiments, a specific thread mode change instruction may be implemented having an operand or field specifying a thread mode, or a thread mode register may be used in conjunction with a thread mode change instruction. The illustrations provided herein are directed primarily to a processor and method for managing simultaneous execution of either one thread (ST mode) or two threads (MT mode), but the techniques are extensible to execution of any number of threads in MT mode and to techniques for switching between a first MT mode and a second MT operating state where one or more threads are revived or disabled.

Control logic 11 detects the thread enable register change associated with the mtctrl command (and may ignore the command or perform alternative behaviors if control logic 11 detects that the set of executing threads has not been changed or attempts to enter an invalid state such as all threads dead). Control logic 11 then holds the thread mode register change pending internally (step 51), permitting control logic 11 to make changes in accordance with the thread set selected for further execution, while not disrupting the final stages of processing for the currently executing mode. Control logic 11 then begins sequencing of processing shutdown for all of the executing threads. First, all internal asynchronous interrupts are blocked, a stop prefetch indication is sent from control logic 11 to LSU 19, a "quiesce" request is sent to ISU 12, and control logic 11 blocks self-generated flushes and maintenance operations that would otherwise be performed (step 52). Next, control logic 11 waits for a number of cycles (25 in this example) to ensure that ISU 12 has received the quiesce request before the next step in the thread mode transition sequence, which directs FXU 14 to send an indication that the mtctrl instruction has finished to ISU 12. The quiesce instruction causes a flush of the processor pipeline and an instruction fetch hold, clearing all instruction pipes so that the mtctrl instruction will be the last instruction executed.

Next, the thread states are monitored for the following conditions: ISU 12 quiesced (all outstanding instructions complete and processor in hold state); Branch Instruction Queue (BIQ) empty (included in IFU 16 in the illustration); GCT 13 empty; system request signal not pending (indicating that no external operations such as translation lookasides, so-called "ugly ops" and any other requests that might result in external hardware interfering with processor core 10 operation after the thread mode switch are not pending) (step 55). Control logic 11 then waits another number of cycles (again 25 cycles in this example) to ensure that IFU 16 and IDU 17 pipes are completely drained (step 56). The above-described steps fully stop execution of all threads previously executing within processor core 10 and ensure that the execution pipelines are clear.

After all threads have been stopped, the thread enable register change pended in step 51, is now posted by control logic 11, which sends a new thread enable state to various internal units including IFU 16, IDU 17, ISU 12 and LSU 19 and sends a strobe signal (thread change pulse) to the above-listed units (step 57). ISU 12 detects the thread mode change and initiates resource reallocation (step 58). After resources have been reallocated among the threads enabled for further execution by the thread enable register change, ISU 12 sends a mode change done indication to control logic 11, that the reallocation is complete (step 59). Next, control logic 11 sends a start indication to ISU 12 for the threads enabled for further execution. If the transition is from ST to SMT mode (decision 61), control logic 11 sends a SRI indication to ISU 12 for the reviving thread and execution of the reviving thread begins in the SRI handler. Finally, control logic 11 enables internal asynchronous interrupts, the stop prefetch command is released, and control logic 11 re-enables self-generated flushes and maintenance operations (step 63), restoring full execution within processor core 10, but for all threads that were specified for further execution in the control change detected in step 51.

Now, in further detail, the resource reallocation of step 58 is described. Generally, methods in accordance with the present invention reallocate storage resisters amongst threads selected for further execution at the thread enable control change, i.e., those threads that are executing after the thread mode transition managed by the above-described method has been completed. But resources also include operation of execution units such as IFU 16, that performs strictly alternating fetches in SMT mode and only fetches for a single thread in ST mode.

In the illustrated embodiment, the reallocation is made allocating equal partitions for two simultaneously executing threads and a partition that includes the entire resource for a single executing thread, realizing symmetrical allocation of resources as between multiple threads in SMT mode and full allocation of resources in ST mode to a single thread. The following table illustrates a reallocation scheme in accordance with the illustrated embodiment:

TABLE 1

| Resource | ST Mode | SMT Mode (2 threads) |
|---|---|---|
| Execution Unit operation | | |
| IFU operation | 1 fetch/cycle | alternating fetch |
| Branch Instruction Queue | 16 deep | 8 deep queues |
| Cache line buffer (CLB) | IDU chooses only 1 | IDU chooses between each thread's CLB |
| Dispatch | Dispatch flushing and CLB holds disabled | Dispatch flushing, CLB holds enabled |
| Non-architected register availability for rename | | |
| GPRs | 84 | 48 |
| FPRs | 88 | 56 |
| XER | 28 | 24 |
| CR | 31 | 22 |
| LR/CTR | 14 | 12 |
| Queues/Streams | | |
| LRQ (load request queue) | 32 deep queue | 16 deep queues |
| SRQ (store request queue) | 32 deep queue | 16 deep queues |
| Load Tags | 64 (32 real, 32 virtual) | 32 (16 real, 16 virtual each thread) |
| Store Tags | 64 (32 real, 32 virtual) | 32 (16 real, 16 virtual each thread) |
| Data prefetch streams | thread can access all streams | each thread can access half of the prefetch streams |

Table 1 shows the various resources that are reallocated in step 59 according to the mode selected for further execution. In general, behavior of the execution units is streamlined, removing hold operations and flush operations that support SMT operation and directing instruction execution and fetching at a single thread's instruction stream. The rename availability reallocation is based on the number of registers that do not have to be maintained for fixed storage, so a switch to ST mode frees up registers that would otherwise be fixed for multi-threaded operation. Queues and streams are allocated on a per-thread basis, using all queue storage for a single thread in ST mode, while dividing the storage equally among threads in SMT mode.

Resource allocation in processor that support simultaneous execution for more than two threads may similarly support transitions between any number of executing threads and threads selected for further execution after a mode change (including MT to MT mode), by allocating the above-resources equally among the threads specified for further execution, or according to another asymmetrical resource reallocation scheme according to other embodiments of the present invention.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for managing transitions between multi-threaded and single-threaded execution in a processor, comprising:
   receiving an instruction indicating a thread mode switch;
   in response to said receiving, stopping execution of a first thread running on said processor;
   further in response to said receiving, determining whether or not said thread mode switch is a switch from a single-threaded to a multi-threaded mode;
   responsive to determining that said thread mode switch is a switch from single-threaded mode to a multi-threaded mode, setting thread enable signals indicating an enable state of multiple threads, wherein at least said first thread and a second thread are specified for further execution;
   subsequent to said stopping, starting said first and second threads; and
   immediately subsequent to and responsive to said starting, sending a interrupt to said second thread that forces execution of said second thread to commence at a predetermined address.

2. The method of claim 1, wherein said interrupt is a system reset interrupt.

3. The method of claim 2, wherein said starting restarts said first thread at an instruction immediately following the last instruction executed by said processor for said first thread prior to said starting.

4. The method of claim 1, wherein said starting restarts said first thread at an instruction immediately following the last instruction executed by said processor for said first thread prior to said starting.

5. The method of claim 1, further comprising to said stopping, blocking prefetches for all threads.

6. The method of claim 1, further comprising prior to said stopping, blocking flushes and maintenance operations within said processor.

7. The method of claim 1, further comprising subsequent to said starting, unblocking prefetches, flushes and maintenance operations within said processor for said one or more threads.

8. The method of claim 1, further comprising:
   prior to said stopping, blocking prefetches for all threads and blocking flushes and maintenance operations within said processor;
   subsequent to said stopping, waiting for instruction sequencing to quiesce and completion tables to be empty; and
   subsequent to said starting, unblocking prefetches flushes and maintenance operations within said processor for said one or more threads.

9. A processor supporting concurrent execution of multiple threads and having a single-threaded operating mode and a multi-threaded operating mode, said processor comprising:
   an instruction decoder supporting a decode of a thread mode change instruction;
   a thread enable register for receiving a thread enable state specifying a requested thread enable state of multiple threads;
   control logic coupled to said instruction decoder for controlling execution units of said processor in conformity with a current thread enable state maintained in said control logic and specifying a current enable state of multiple threads;
   one or more execution control units coupled to said control logic for controlling execution of instructions within said processor, and wherein said control logic signals said one or more execution control units to stop execution of instructions for all threads executing within said processor in response to an indication from said instruction decoder that said thread mode change instruction has been received, wherein said control logic further determines that execution has been stopped for all threads, updates said current thread enable state in conformity with said requested thread enable state in said thread enable register after said execution has been stopped, wherein said control logic also determines whether or not said thread mode change instruction corresponds to a switch from a single-threaded to a multi-threaded mode for continuing execution of a first thread and reviving a second thread, and after said current thread mode has been updated, signals said execution control units to commence execution of one or more threads specified by said current thread enable state, and wherein said control logic in response to determining that said thread mode change instruction corresponds to a switch from said single-threaded mode to said multi-threaded mode, issues an interrupt to said second thread that forces execution of said second thread to commence at a predetermined address.

10. The processor of claim 9, wherein said interrupt is a a system reset interrupt.

11. The processor of claim 9, wherein said one or more execution units restart execution of said executing thread at an instruction immediately following the last instruction executed for said executing thread prior to said starting.

12. The processor of claim 9, wherein a given one of said execution units is a prefetch unit, and wherein said control logic signals said prefetch unit to block prefetches for all threads prior to updating said current thread mode.

13. The processor of claim 9, wherein a given one of said execution units manages flushes and maintenance operations within said processor, and wherein said control logic signals said given execution unit to block flushes and stop maintenance operations for all threads prior to updating said current thread mode.

14. The processor of claim 9, wherein a given one of said execution units manages flushes and maintenance operations within said processor, and wherein said control logic signals said given execution unit to enable flushes and start maintenance operations for said one or more threads after starting execution of said one or more threads.

15. The processor of claim 9, wherein a given one of said execution units is a prefetch unit, and wherein said control logic signals said prefetch unit to enable prefetches for all threads after starting execution of said one or more threads.

16. A processor supporting concurrent execution of multiple threads and having a single-threaded operating mode and a multi-threaded operating mode, said processor comprising:
   an instruction decoder supporting a decode of a thread mode change instruction;
   a thread enable register for receiving a thread enable state specifying a requested thread enable state of multiple threads;
   control logic coupled to said instruction decoder for controlling execution units of said processor in conformity with a current thread enable state maintained in said control logic and specifying a current enable state of multiple threads;
   one or more execution control units coupled to said control logic for controlling execution of instructions within said processor, and wherein said control logic signals said one or more execution control units to stop execution of instructions, prefetches, interrupts, flushes and maintenance operations for all threads executing within said processor in response to an indication from said instruction decoder that said thread mode change instruction has been received, wherein said control logic further determines that execution has been stopped for all threads, updates said current thread enable state in conformity with said requested thread enable state in said thread enable register, after said execution has been stopped, wherein said control logic also determines whether or not said thread mode change instruction corresponds to a switch from a single-threaded to a multi-threaded mode for continuing execution of a first thread and reviving a second thread, and after said current thread mode has been updated, signals said execution control units to commence execution of one or more threads specified by said current thread enable state, restarts prefetches, interrupts, flushes and maintenance operations for said one or more threads, and wherein said control logic in response to determining that said thread mode change instruction corresponds to a switch from said single-threaded mode to said multi-threaded mode, issues a system reset interrupt to said second thread that forces execution of said second thread to commence at a predetermined address.

* * * * *